US012786228B2

(12) United States Patent
Katti et al.

(10) Patent No.: US 12,786,228 B2
(45) Date of Patent: Nov. 3, 2026

(54) MITIGATING INSTANCES OF DELAY ATTACKS IN A COMMUNICATION NETWORK

(71) Applicant: GM Global Technology Operations LLC, Detroit, MI (US)

(72) Inventors: Bhagyashri Katti, Novi, MI (US); Markus Jochim, Troy, MI (US); Mohamed A. Layouni, Macomb, MI (US); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 19/037,872

(22) Filed: Jan. 27, 2025

(65) Prior Publication Data

US 2026/0222438 A1 Jul. 30, 2026

(51) Int. Cl.
*H04L 9/40* (2022.01)
*H04L 43/106* (2022.01)

(52) U.S. Cl.
CPC ........ *H04L 63/1441* (2013.01); *H04L 43/106* (2013.01); *H04L 63/1408* (2013.01)

(58) Field of Classification Search
CPC ............... H04L 63/1441; H04L 43/106; H04L 63/1408
See application file for complete search history.

(56) References Cited

U.S. PATENT DOCUMENTS

| | | | | | |
|---|---|---|---|---|---|
| 6,055,314 | A * | 4/2000 | Spies | G07F 7/1008 380/278 |
| 6,751,238 | B1 * | 6/2004 | Lipp | H04J 3/062 370/516 |
| 7,873,065 | B1 * | 1/2011 | Mukerji | H04L 47/365 370/429 |
| 8,996,052 | B1 * | 3/2015 | Hardie | H04W 64/003 375/240 |
| 9,332,434 | B1 * | 5/2016 | Dotan | H04W 12/06 |
| 9,452,355 | B1 * | 9/2016 | Lin | A63F 13/53 |
| 9,553,694 | B1 * | 1/2017 | Elangovan | H04K 3/90 |
| 9,979,550 | B1 * | 5/2018 | Fiedler | A63F 13/31 |
| 10,218,499 | B1 * | 2/2019 | El Idrissi | G06F 21/44 |
| 10,255,424 | B1 * | 4/2019 | Lunsford | H04L 9/085 |
| 10,397,085 | B1 * | 8/2019 | Seth | G06F 11/0709 |

(Continued)

*Primary Examiner* — Aravind K Moorthy
(74) *Attorney, Agent, or Firm* — Vivacqua Crane, PLLC

(57) ABSTRACT

A communication network for mitigating delay attacks includes one or more sender nodes in electronic communication with one or more receiver nodes. The one or more receiver nodes execute instructions to periodically transmit, by a receiver node, a challenge message to a sender node. In response to accepting the challenge message and determining there is data to transmit to the receiver node, the sender node transmits a functional message to the receiver node. In response to determining an updated freshness value is more recent when compared to a current freshness value associated with the sender node, a sender message authentication code is correct and consistent over at least one previous challenge message, and the response to the challenge message from the receiver node is correct, the receiver node updates the current freshness value to match the updated freshness value and accepts the functional message.

20 Claims, 6 Drawing Sheets

(56) References Cited

U.S. PATENT DOCUMENTS

| | | | | | |
|---|---|---|---|---|---|
| 10,749,680 | B1 * | 8/2020 | Troia | B60R 25/24 | |
| 11,016,926 | B1 * | 5/2021 | Nasser | H04L 9/0897 | |
| 11,533,619 | B1 * | 12/2022 | Kahn | H04L 63/0853 | |
| 11,546,322 | B1 * | 1/2023 | Hardjono | H04L 67/131 | |
| 11,564,266 | B1 * | 1/2023 | Kahn | H04W 4/24 | |
| 12,088,672 | B1 * | 9/2024 | Zeh | H04L 47/2475 | |
| 12,267,235 | B1 * | 4/2025 | Manghirmalani | H04L 45/74 | |
| 12,373,365 | B1 * | 7/2025 | Mishra | G06F 13/4295 | |
| 12,526,153 | B2 * | 1/2026 | Zeh | H04L 9/14 | |
| 12,526,161 | B2 * | 1/2026 | Tadepalli | H04L 9/3265 | |
| 2001/0009025 | A1 * | 7/2001 | Ahonen | H04W 12/069 | 713/161 |
| 2003/0028666 | A1 * | 2/2003 | Hanner | H04L 49/9094 | 709/238 |
| 2004/0062278 | A1 * | 4/2004 | Hadzic | H03L 7/085 | 370/503 |
| 2004/0158741 | A1 * | 8/2004 | Schneider | G06F 21/562 | 726/24 |
| 2005/0055576 | A1 * | 3/2005 | Mononen | H04W 8/082 | 726/4 |
| 2005/0289082 | A1 * | 12/2005 | Morris | H04L 9/3271 | 705/65 |
| 2006/0123226 | A1 * | 6/2006 | Kumar | H04L 63/0281 | 713/154 |
| 2006/0190715 | A1 * | 8/2006 | Miller | H04L 67/104 | 713/150 |
| 2007/0143655 | A1 * | 6/2007 | Niu | H04L 27/2602 | 714/752 |
| 2007/0213888 | A1 * | 9/2007 | Shidai | H04J 3/0682 | 701/1 |
| 2007/0223472 | A1 * | 9/2007 | Tachibana | H04L 47/36 | 370/473 |
| 2009/0276686 | A1 * | 11/2009 | Liu | H04L 1/0045 | 714/776 |
| 2009/0327533 | A1 * | 12/2009 | Kallam | G06F 13/28 | 710/110 |
| 2010/0053462 | A1 * | 3/2010 | Candelore | H04N 21/42221 | 348/734 |
| 2010/0077216 | A1 * | 3/2010 | Kramer | H04L 9/0841 | 713/172 |
| 2010/0189257 | A1 * | 7/2010 | Bjorkengren | H04N 21/42623 | 380/268 |
| 2010/0315965 | A1 * | 12/2010 | Nemeth | H04L 1/0047 | 370/252 |
| 2011/0066856 | A1 * | 3/2011 | Yao | H04L 9/3271 | 380/278 |
| 2011/0188653 | A1 * | 8/2011 | Yao | H04K 1/00 | 380/255 |
| 2011/0211530 | A1 * | 9/2011 | Bajar | H04L 63/0853 | 370/328 |
| 2011/0296185 | A1 * | 12/2011 | Kamarthy | H04L 63/1441 | 713/168 |
| 2012/0054491 | A1 * | 3/2012 | Tippett | H04L 9/3213 | 713/168 |
| 2012/0117446 | A1 * | 5/2012 | Taghavi Nasrabadi | H04L 1/0041 | 714/776 |
| 2012/0210187 | A1 * | 8/2012 | Yin | H04L 1/1671 | 714/751 |
| 2012/0324557 | A1 * | 12/2012 | Rubin | G06F 21/50 | 726/7 |
| 2013/0250959 | A1 * | 9/2013 | Van Wyk | H04L 47/365 | 370/393 |
| 2013/0282438 | A1 * | 10/2013 | Hunter | G06Q 30/0201 | 705/7.32 |
| 2014/0109220 | A1 * | 4/2014 | Inkumsah | G06F 21/316 | 726/19 |
| 2014/0344379 | A1 * | 11/2014 | Chakraborti | H04L 12/1831 | 709/206 |
| 2014/0370879 | A1 * | 12/2014 | Redding | H04M 3/42178 | 455/419 |
| 2015/0012737 | A1 * | 1/2015 | Newell | G06F 21/44 | 713/2 |
| 2015/0036823 | A1 * | 2/2015 | Graube | H04W 12/04 | 380/46 |
| 2015/0087241 | A1 * | 3/2015 | Van Wiemeersch | H04L 67/141 | 455/67.13 |
| 2015/0341175 | A1 * | 11/2015 | Mosko | H04L 9/3236 | 713/167 |
| 2015/0349961 | A1 * | 12/2015 | Mosko | H04L 9/3247 | 713/189 |
| 2016/0041601 | A1 * | 2/2016 | Larson | G06F 11/2033 | 713/320 |
| 2016/0285659 | A1 * | 9/2016 | Qi | H04B 7/2048 | |
| 2016/0300054 | A1 * | 10/2016 | Turgeman | G06F 21/36 | |
| 2016/0337723 | A1 * | 11/2016 | Graves | H04Q 11/0005 | |
| 2016/0344552 | A1 * | 11/2016 | Sharma | G05B 19/418 | |
| 2017/0085512 | A1 * | 3/2017 | Bray | H04L 51/214 | |
| 2017/0085648 | A1 * | 3/2017 | Aw | H04L 67/12 | |
| 2017/0126709 | A1 * | 5/2017 | Baradaran | H04L 63/1441 | |
| 2017/0134174 | A1 * | 5/2017 | Cambou | G02B 1/002 | |
| 2017/0220801 | A1 * | 8/2017 | Stockdale | H04L 63/1425 | |
| 2017/0250953 | A1 * | 8/2017 | Jain | G06F 21/552 | |
| 2017/0353302 | A1 * | 12/2017 | Fernandez | H04L 9/14 | |
| 2018/0186332 | A1 * | 7/2018 | Bocca | H04W 4/40 | |
| 2018/0198821 | A1 * | 7/2018 | Gopalakrishna | G06F 21/566 | |
| 2018/0255075 | A1 * | 9/2018 | Brugger | H04L 63/101 | |
| 2018/0279002 | A1 * | 9/2018 | Cugi | H04N 21/4627 | |
| 2018/0337803 | A1 * | 11/2018 | Sauerwein, Jr. | H04L 12/66 | |
| 2019/0044740 | A1 * | 2/2019 | Smith | H04W 12/009 | |
| 2019/0141572 | A1 * | 5/2019 | Zaks | H04W 12/106 | |
| 2019/0207950 | A1 * | 7/2019 | Mohammed | G06F 21/606 | |
| 2019/0260596 | A1 * | 8/2019 | Pala | H04L 9/3268 | |
| 2019/0354936 | A1 * | 11/2019 | Deluca | A63B 71/0616 | |
| 2020/0005570 | A1 * | 1/2020 | Troia | B60R 25/2072 | |
| 2020/0036580 | A1 * | 1/2020 | Raj | H04L 41/0677 | |
| 2020/0053563 | A1 * | 2/2020 | Birchenko | H04W 8/005 | |
| 2020/0100082 | A1 * | 3/2020 | Balasubramanian | H04W 4/90 | |
| 2020/0146093 | A1 * | 5/2020 | Zhang | H04L 5/0053 | |
| 2020/0196153 | A1 * | 6/2020 | Agarwal | H04W 4/80 | |
| 2020/0211301 | A1 * | 7/2020 | Zhang | G07C 5/0808 | |
| 2020/0213281 | A1 * | 7/2020 | Mondello | H04L 9/0643 | |
| 2020/0213287 | A1 * | 7/2020 | Zhang | H04L 63/123 | |
| 2020/0252376 | A1 * | 8/2020 | Feng | H04L 45/74 | |
| 2020/0267168 | A1 * | 8/2020 | Lee | H04L 63/1416 | |
| 2020/0272717 | A1 * | 8/2020 | Figueredo de Santana | G06V 40/172 | |
| 2020/0274873 | A1 * | 8/2020 | Guionneau | H04L 9/14 | |
| 2020/0311254 | A1 * | 10/2020 | Mondello | H04L 9/3247 | |
| 2020/0313898 | A1 * | 10/2020 | Troia | H04L 9/088 | |
| 2020/0322277 | A1 * | 10/2020 | Li | H04L 47/365 | |
| 2021/0058792 | A1 * | 2/2021 | Bhushan | H04L 25/03866 | |
| 2021/0084072 | A1 * | 3/2021 | Elend | H04L 63/10 | |
| 2021/0092734 | A1 * | 3/2021 | Yang | H04L 5/0053 | |
| 2021/0203682 | A1 * | 7/2021 | Bajpai | H04L 63/1441 | |
| 2021/0279057 | A1 * | 9/2021 | Prunier | G06F 12/0808 | |
| 2021/0314901 | A1 * | 10/2021 | Issakov | G01S 5/0221 | |
| 2021/0334373 | A1 * | 10/2021 | Yanamadala | G06N 20/20 | |
| 2021/0390617 | A1 * | 12/2021 | Samid | G06F 21/602 | |
| 2021/0398370 | A1 * | 12/2021 | Troia | H04W 12/108 | |
| 2022/0014918 | A1 * | 1/2022 | Mastenbrook | G06F 21/64 | |
| 2022/0070149 | A1 * | 3/2022 | Sellers, Jr. | H04L 63/0428 | |
| 2022/0086022 | A1 * | 3/2022 | Ye | H04L 12/40163 | |
| 2022/0086170 | A1 * | 3/2022 | Ye | H04L 9/32 | |
| 2022/0138745 | A1 * | 5/2022 | Liu | H04L 9/3297 | 705/75 |
| 2022/0272532 | A1 * | 8/2022 | Kim | H04W 60/00 | |
| 2022/0311616 | A1 * | 9/2022 | Moore | H04L 63/08 | |
| 2022/0355763 | A1 * | 11/2022 | Patne | H04W 4/38 | |
| 2022/0417213 | A1 * | 12/2022 | Thubert | H04L 63/12 | |
| 2023/0026245 | A1 * | 1/2023 | Singamsetty | H04L 63/068 | |
| 2023/0096276 | A1 * | 3/2023 | Venugopal | G06F 11/2094 | 707/813 |
| 2023/0199485 | A1 * | 6/2023 | Balasubramanian | H04W 12/0431 | 380/283 |
| 2023/0216682 | A1 * | 7/2023 | Lipton | G06F 21/10 | 713/172 |

(56) References Cited

U.S. PATENT DOCUMENTS

2023/0254322 A1* 8/2023 Nelson .................... H04L 12/40 726/4
2023/0269583 A1* 8/2023 Jerichow ............... H04W 12/06 455/411
2023/0281583 A1* 9/2023 Jakobsson ............ G06Q 20/123
2023/0291548 A1* 9/2023 Mastenbrook ........ H04L 9/0825
2023/0305988 A1* 9/2023 Fukuno ............... G06F 13/4282
2023/0345246 A1* 10/2023 Khare ................. H04L 63/0884
2024/0036824 A1* 2/2024 Burgess ................ G06F 7/5443
2024/0121105 A1* 4/2024 Lejin P J .............. H04L 41/085
2024/0195799 A1* 6/2024 Ramamoorthy ...... H04L 63/083
2024/0196266 A1* 6/2024 Schelstraete ...... H04W 28/0268
2024/0220519 A1* 7/2024 Badii .................... G06F 16/235
2024/0235841 A1* 7/2024 Osborn ................. H04L 9/3234
2024/0244429 A1* 7/2024 Nie ....................... H04W 12/69
2024/0267790 A1* 8/2024 Deshmukh ............ H04W 28/06
2024/0276213 A1* 8/2024 Mavureddi Dhanasekaran .......... H04W 12/06
2024/0414527 A1* 12/2024 Zeh ..................... H04L 63/0428
2024/0430043 A1* 12/2024 Uziel .................... H04L 1/1812
2025/0016102 A1* 1/2025 Wojciechowski .... H04L 1/0061
2025/0097219 A1* 3/2025 Hari .................... H04L 63/0861
2025/0131640 A1* 4/2025 Barczak .................. G06T 15/06
2025/0158808 A1* 5/2025 Zeh ....................... H04L 9/0838
2025/0190536 A1* 6/2025 Shachor .................. G06F 21/44
2025/0217469 A1* 7/2025 Kashani .................. G06F 21/44
2025/0219841 A1* 7/2025 Zeh ....................... H04L 9/3242
2025/0247260 A1* 7/2025 Chandra ................. H04L 12/12
2025/0267506 A1* 8/2025 Sugawara ............. H04W 12/06
2025/0267507 A1* 8/2025 Sugawara ............. H04L 63/123
2025/0286870 A1* 9/2025 Hans .................. H04W 12/041
2025/0293803 A1* 9/2025 Ivanov .................. H04L 1/0057
2025/0294552 A1* 9/2025 Yang ..................... H04L 1/1845
2025/0304010 A1* 10/2025 Kanala .................... H04L 63/08
2025/0315513 A1* 10/2025 Richmond .............. G06F 21/44
2025/0317308 A1* 10/2025 Eckel .................... H04L 9/3271
2025/0358102 A1* 11/2025 Thundathil ........... H04L 9/0825
2025/0385789 A1* 12/2025 Dover ................... G06F 21/445
2025/0392417 A1* 12/2025 Yang ..................... H04L 5/0005
2026/0019475 A1* 1/2026 Alva ....................... H04L 69/22
2026/0031989 A1* 1/2026 Zeh .......................... H04L 9/32
2026/0046259 A1* 2/2026 Zeh ..................... H04L 47/2466
2026/0067061 A1* 3/2026 Mora-Golding ........ G06F 21/64
2026/0082387 A1* 3/2026 Khoshnevisan ...... H04L 1/1861
2026/0095337 A1* 4/2026 Zheng ................... H04L 9/3271
2026/0101189 A1* 4/2026 Brusilovsky ........ H04L 63/1458
2026/0136192 A1* 5/2026 Sandström ............ H04L 63/123

* cited by examiner

MITIGATING INSTANCES OF DELAY ATTACKS IN A COMMUNICATION NETWORK

INTRODUCTION

The present disclosure relates to a communication network for mitigating instances of delay attacks between a sender node and one or more receiver nodes by having the one or more receiver nodes verify a freshness value and a message authentication code associated with the sender node.

A communication network includes multiple computing devices, which are also referred to as nodes, that transmit and receive information over a communication link. The communication link may be wired or wireless and implemented either in hardware or in software. The communication link may be point-to-point, where each pair of devices are connected directly to each and send data only to each other or, in the alternative, bus-based where multiple devices share the same communication link with all devices on the bus receiving the same information broadcast from one source. When the communication network is implemented in a vehicle, the nodes may represent devices such as, but not limited to, electronic control units (ECUs), smart sensors, and smart actuators.

A man-in-the-middle (MitM) attack occurs when an unauthorized party inserts themselves between two nodes that are part of the communication network for the purpose of intercepting communication. In one instance, the unauthorized party may eavesdrop or impersonate one of the nodes. In another instance, the unauthorized party may create a delay attack. A delay attack involves the unauthorized party holding one of the messages transmitted from a sender node for some period of time. After the period of time has elapsed, the unauthorized party may then transmit the message received from the sender node to a receiver node. However, the receiver node only checks to ensure the freshness value included within the message is more recent when compared to a threshold or minimum freshness value. As long as the freshness value included in the message is more recent when compared to the minimum freshness value, the receiver node accepts the message. Thus, there is currently no approach to identify when the message was delayed for some period of time before being delivered to the receiver node. Furthermore, it is to be appreciated that some systems within applications such as, for example, automotive, aerospace, and manufacturing may be especially sensitive to delay attacks lasting even a few milliseconds.

Thus, while communication networks achieve their intended purpose, there is a need in state-of-the-art techniques for an approach to mitigate instances of delay attacks.

SUMMARY

According to several aspects, a communication network for mitigating delay attacks is disclosed. The communication network includes one or more sender nodes, one or more receiver nodes, and a communication link, where the one or more sender nodes are in electronic communication with the one or more receiver nodes by the communication link. The one or more sender nodes and the one or more receiver nodes execute instructions to periodically transmit, by a receiver node that is part of the one or more receiver nodes, a challenge message to a sender node at a heartbeat time interval. The sender node accepts the challenge message. In response to accepting the challenge message and determining there is data to transmit to the receiver node, the sender node transmits a functional message to the receiver node including a sender message authentication code that is computed based on a concatenation of an updated freshness value associated with the sender node, a payload, and the challenge message. In response to determining the updated freshness value is more recent when compared to a current freshness value associated with the sender node, the sender message authentication code is correct and consistent over at least one previous challenge message from the receiver node, and the challenge message from the receiver node is correct, the receiver node updates the current freshness value to match the updated freshness value and accept the functional message.

In another aspect, the challenge message includes a receiver nonce.

In yet another aspect, the challenge message includes a receiver message authentication code that is generated based on the receiver nonce.

In an aspect, the challenge message is a challenge response to the challenge message that confirms the receiver nonce included in the challenge message is correct.

In another aspect, the updated freshness value is created by the sender node at the time the functional message is generated.

In yet another aspect, the current freshness value represents a freshness value associated with the sender node as understood by the receiver node.

In an aspect, the receiver node confirms the sender message authentication code is correct and consistent over a predefined number of previous challenge messages from the receiver node, and where the predefined number is equal to or greater than 2.

In another aspect, the challenge message from the receiver node is implicitly included as part of the functional message.

In yet another aspect, the one or more sender nodes and the one or more receiver nodes are one of the following: an electronic control module (ECU) that controls one or more systems that are part of a vehicle, a smart sensor, and a smart actuator.

In an aspect, a communication network for mitigating delay attacks is disclosed. The communication network includes one or more sender nodes, a plurality of receiver nodes, and a communication link, where the one or more sender nodes are in electronic communication with the plurality of receiver nodes by the communication link. The one or more sender nodes and the plurality of receiver nodes execute instructions to periodically transmit, by the plurality of receiver nodes, a unique challenge message to a sender node at a heartbeat time interval, where each unique challenge message corresponds to one of the plurality of receiver nodes. The sender node accepts the unique challenge messages. In response to accepting the unique challenge messages from the plurality of receiver nodes and determining there is data to transmit to two or more receiver nodes, the sender node transmits a functional message to the two or more receiver nodes that includes an updated freshness value associated with the sender node, a payload, the unique challenge messages from the two or more receiver nodes, and a sender message authentication code that is computed based on a concatenation of the freshness value, the payload, and the unique challenge messages from the two or more receiver nodes. In response to determining the updated freshness value is more recent when compared to a current freshness value associated with the sender node, the sender message authentication code is correct and consistent over at least one previous challenge message from a particular receiver node, and the unique challenge message from the particular receiver node is correct, the particular receiver node updates the current freshness value to match the updated freshness value and accept the functional message.

In another aspect, the unique challenge message includes a receiver nonce.

In yet another aspect, the unique challenge message includes a receiver message authentication code that is generated based on the receiver nonce.

In an aspect, the updated freshness value is created by the sender node at the time the functional message is generated.

In another aspect, the current freshness value represents a freshness value associated with the sender node as understood by the particular receiver node.

In yet another aspect, the unique challenge message from the receiver node is explicitly included as part of the functional message.

In an aspect, a communication network for mitigating delay attacks in a vehicle is disclosed. The communication network includes one or more sender nodes, one or more receiver nodes, where the one or more sender nodes and the one or more receiver nodes are an electronic control module (ECU) that controls one or more systems that are part of the vehicle, and a communication link. The one or more sender nodes are in electronic communication with the one or more receiver nodes by the communication link, and the one or more receiver nodes execute instructions to upon boot, initialize a status of a sender node as non-responsive, where the one or more receiver nodes store the status of the sender node in memory. The one or more receiver nodes start a heartbeat timer based on a heartbeat time interval and a liveliness timer based on a liveliness time interval, where the liveliness time interval is less than the heartbeat time interval. The one or more receiver nodes monitor the heartbeat timer until determining the heartbeat time interval has elapsed. In response to determining the heartbeat time interval has elapsed, transmit, by the one or more receiver nodes, a challenge message to a sender node and reset both the heartbeat timer and the liveliness timer, where the challenge message includes a receiver nonce. The one or more receiver nodes receive a response message from the sender node before the liveliness time interval has elapsed, where the response message includes a sender message authentication code that is computed based on a concatenation of an updated freshness value associated with the sender node and the receiver nonce from the challenge message. In response to determining the updated freshness value is more recent when compared to a current freshness value, the sender message authentication code is correct and consistent with the receiver nonce, and the receiver nonce is correct, update the current freshness value to match the updated freshness value, accept the response message, and set the status of the sender node as responsive.

In another aspect, the one or more receiver nodes accepts functional messages from the sender node in response to determining the status of the sender node is responsive.

In yet another aspect, the one or more receiver nodes accepts response messages from the sender node in response to determining the status of the sender node is either responsive or non-responsive.

In an aspect, the one or more receiver nodes execute instructions to receive a functional message from the sender node, where the functional message includes a secondary sender message authentication code that is computed based on a concatenation of a secondary updated freshness value and a payload, and compare the secondary updated freshness value with the current freshness value associated with the sender node, confirm the secondary sender message authentication code is correct and consistent over at least one previous challenge message, and confirm the status of the sender node is set to responsive.

In another aspect, the one or more receiver nodes execute instructions to in response to determining the secondary updated freshness value is more recent when compared to the current freshness value, the secondary sender message authentication code is correct and consistent over at least one previous challenge message, and the status of the sender node is set to responsive, update the current freshness value to match the secondary updated freshness value and accept the functional message from the sender node.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
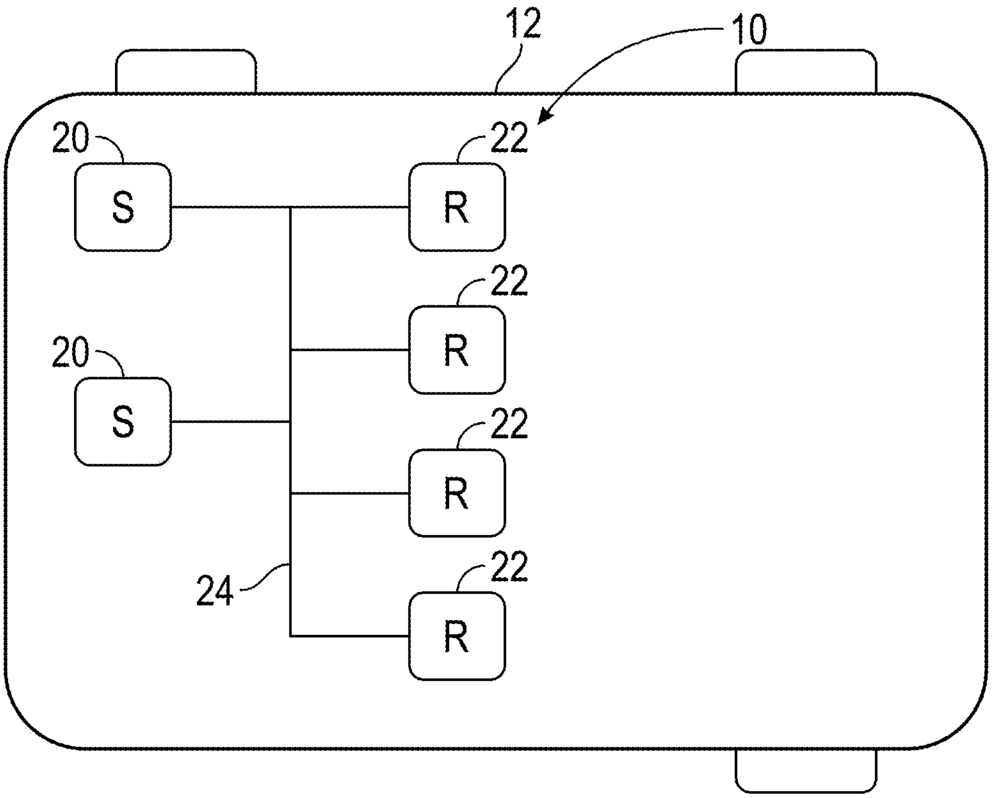
FIG. 1 is a schematic diagram of a vehicle including the disclosed communication network, where the communication network includes one or more sender nodes and one or more receiver nodes in electronic communication with one another by a communication link, according to an exemplary embodiment.

Referring to FIG. 1, a schematic diagram illustrating an exemplary communication network 10 that is part of a vehicle 12 is shown. The communication network 10 includes one or more sender nodes 20 and one more receiver nodes 22 that are in electronic communication with one another by a communication link 24. As seen in the figures, the sender nodes 20 are denoted with the letter 'S', while the receiver nodes 22 are denoted with the letter 'R'. The communication link 24 is implemented either in hardware, such as a bus communication system, or wirelessly. In the embodiment as shown in FIG. 1, the communication network 10 is implemented as part of a vehicle such as, but not limited to, a sedan, truck, sport utility vehicle, van, or motor home. However, it is to be appreciated that FIG. 1 is merely exemplary in nature and the disclosed communication network 10 is not limited to a vehicle. Indeed, the communication network 10 may be implemented in a variety of other applications such as, for example, industrial automation control systems, aerospace applications, and autonomous mobile robots (AMRs).

In one non-limiting embodiment, the communication link 24 is a bus based on a protocol such as, but not limited to, switched Ethernet or the controller area network (CAN) protocol. Alternatively, in another embodiment, the communication link 24 is implemented wirelessly based on a protocol such as, for example, the Institute of Electrical and Electronics Engineers (IEEE) 802.11 or the IEEE 802.15 family of standards.

The one or more sender nodes 20 and the one or more receiver nodes 22 each represent computing devices that include one or more processors and memory. In one non-limiting embodiment, the nodes 20, 22 represent electronic control modules (ECUs) that control one or more systems that are part of the vehicle 12. In another embodiment, the nodes 20, 22 may represent devices including at least one processor such as, but not limited to, smart sensors and smart actuators. In the embodiment as shown in FIG. 1, two sender nodes 20 and four receiver nodes 22 are illustrated, however, it is to be appreciated that FIG. 1 is merely exemplary in nature and the communication network 10 is not limited to a specific number of sender and receiver nodes 20, 22.

Figure 4A:
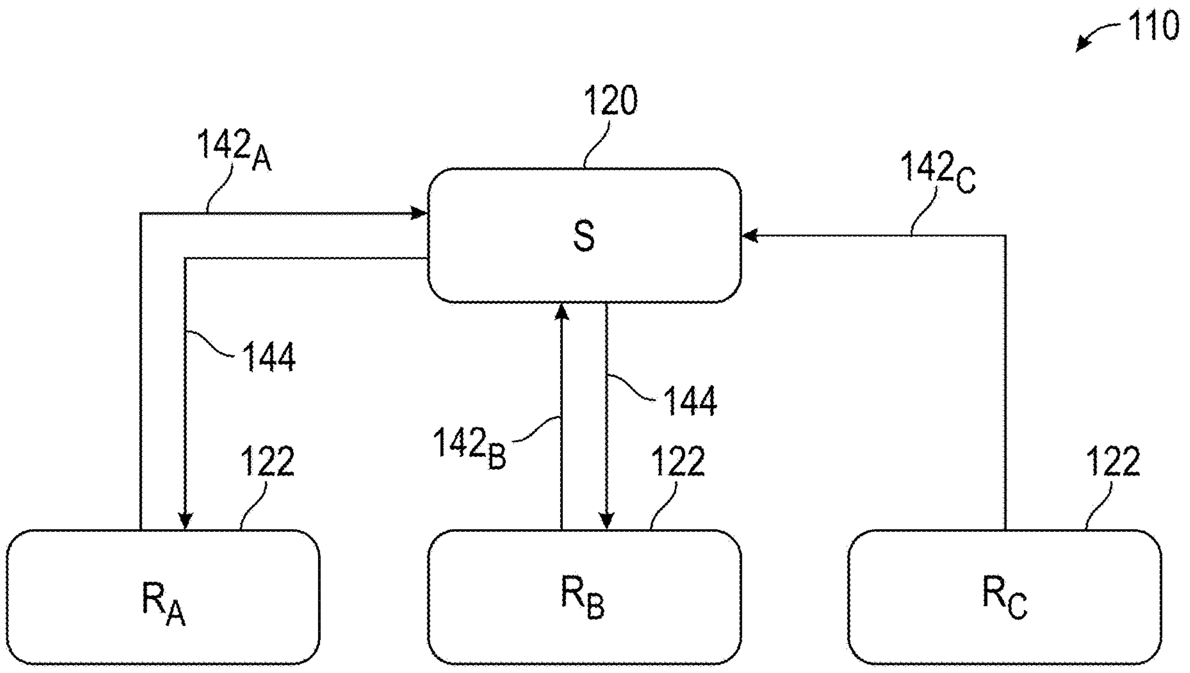
FIG. 4A illustrates a multicast transmission by the communication network shown in FIG. 1 involving a single sender node and a plurality of receiver nodes, according to an exemplary embodiment.
Figure 4B:
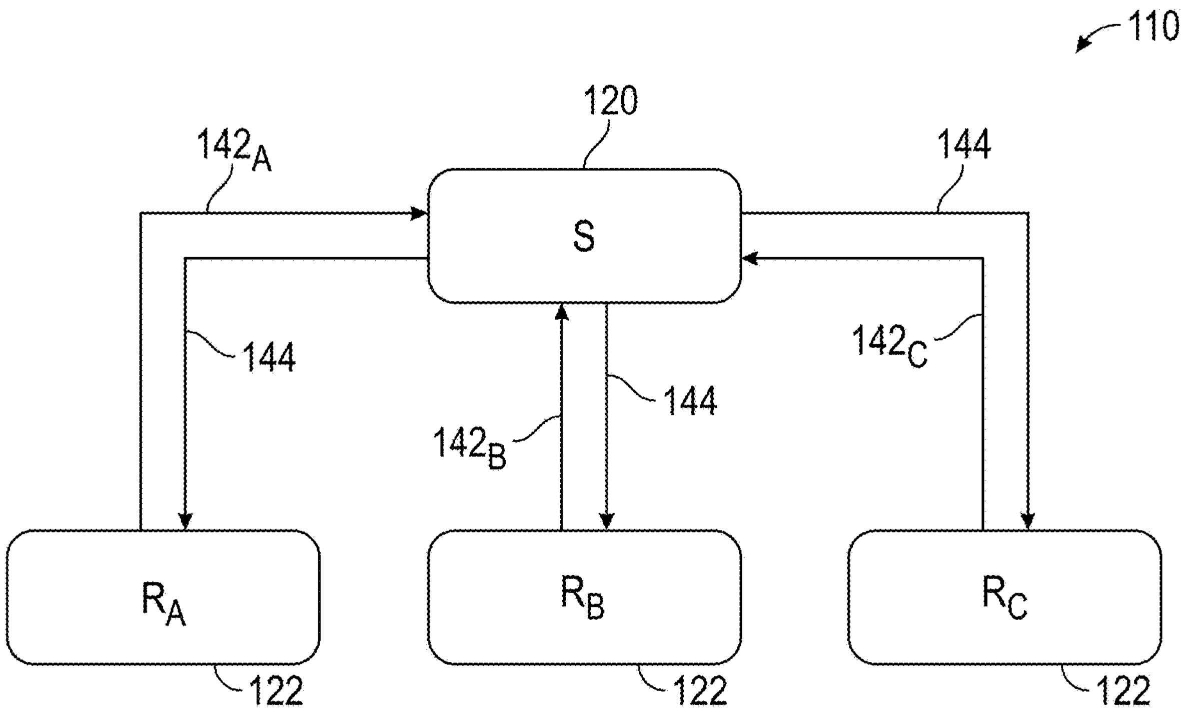
FIG. 4B illustrates another embodiment of the multicast transmission shown in FIG. 4A, according to an exemplary embodiment.

As explained below, the communication network 10 mitigates delay attacks based on challenge messages and functional messages exchanged between a sender node 20 and one or more of the receiver nodes 22. In the embodiment as described below and illustrated in FIG. 2, the communication network 10 is based on a unicast transmission where a sender node 20 exchanges messages with a single receiver node 22. In another embodiment, which is shown in FIGS. 4A-4B and described below, the communication network 10 is based on a multicast transmission.

Figure 2:
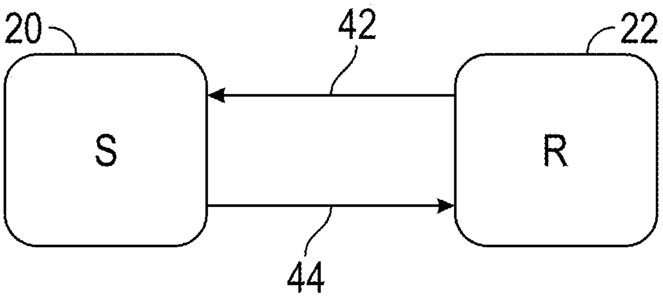
FIG. 2 illustrates a unicast transmission by the communication network shown in FIG. 1 involving a single sender node and a single receiver node, according to an exemplary embodiment.

Referring to FIG. 2, the receiver node 22 starts a timer based on a heartbeat time interval $T_h$ on boot or startup. The heartbeat time interval $T_h$ specifies the frequency at which the receiver node 22 verifies the liveness of the sender node 20. In one non-limiting embodiment, the value of the heartbeat time interval $T_h$ may range from about ten milliseconds to about ten seconds. It is to be appreciated that a shorter heartbeat time interval $T_h$ results in an increased speed at which the receiver node 22 detects the sender node 20 is non-operational or non-responsive, while lengthening the heartbeat time interval $T_h$ results in improving the bandwidth of the communication network 10.

The receiver node 22 periodically transmits a challenge message 42 to the sender node 20 at the heartbeat time interval $T_h$. In one embodiment, the challenge message 42 includes a receiver nonce ($N_i$) and a receiver message authentication code ((MAC) ($N_i$)) that is generated based on the receiver nonce $N_i$. It is to be appreciated that in embodiments where the receiver nonce $N_i$ is difficult to predict, the challenge message 42 may omit the receiver message authentication code and only includes the receiver nonce $N_i$. As an example, the receiver nonce $N_i$ may be difficult to predict based on the type of algorithm used for generating the receiver nonce $N_i$. If the algorithm is simple then the receiver nonce $N_i$ may be easy to predict. For example, if the algorithm generates a new receiver nonce by adding some fixed number to the previous receiver nonce $N_i$, then the receiver nonce $N_i$ is easy to predict. As another example, the receiver nonce $N_i$ may be difficult to predict based on its bit length. In some implementations where the heartbeat time interval $T_h$ is relatively long and the sender node 20 is instructed to respond only to one or a small number of challenge messages 42 in each heartbeat time interval $T_h$, the receiver nonce $N_i$ may be as short as 48 bits long in order to be difficult to predict, while in other implementations where the heartbeat time interval $T_h$ is relatively short, the receiver nonce $N_i$ may be 64 bits long in order to be difficult to predict.

In response to receiving the challenge message 42, the sender node 20 either accepts or rejects the challenge message 42. Specifically, the sender node 20 may accept the challenge message 42 by confirming the receiver message authentication code is correct and consistent with the receiver nonce $N_i$. In an embodiment where the receiver message authentication code is omitted, the sender node 20 may accept the challenge message 42 by confirming the bit length of the receiver nonce $N_i$.

It is to be appreciated that when the sender node 20 accepts the challenge message 42, the sender node 20 implicitly recognizes the receiver node 22 as being alive. Accordingly, once the sender node 20 has data to transmit to the receiver node 22, the sender node 20 creates a functional message 44, which is described below. In response to the sender node 20 rejecting the challenge message 42, the sender node 20 does nothing and implicitly considers the receiver node 22 as potentially unhealthy or non-responsive.

In one embodiment, if the receiver node 22 does not receive a functional message 44 from the sender node 20 after transmitting a threshold number of challenge messages 42, then the receiver node 22 may set a diagnostic trouble code (DTC) or raise a flag indicating that the sender node 20 is in a state of permanent non-responsiveness. The receiver node 22 may then stop querying the sender node 20 for liveness. The threshold number of challenge messages 42 may be a system parameter that is based on the specific application.

In response to accepting the challenge message 42 and determining there is data to transmit to the receiver node 22, the sender node 20 creates and transmits the functional message 44 to the receiver node 22. As seen in Table 1 below, the functional message 44 includes an updated freshness value $FV_{Snew}$ associated with the sender node 20, a payload, and the challenge message 42 from the receiver node 22 (Challenge). Specifically, the functional message 44 includes a sender message authentication code (Sender MAC) that is computed based on a concatenation of the updated freshness value $FV_{Snew}$, the payload, and the challenge message 42 from the receiver node 22 (i.e., $FV_{Snew}$||Payload||Challenge). It is to be appreciated that the challenge message 42 (Challenge), which is included in the message authentication code (Sender MAC) as a concatenation of the updated freshness value $FV_{Snew}$, the payload, and the challenge message 42 from the receiver node 22, is the receiver nonce $N_i$ sent by the receiver node 22.

TABLE 1

| functional message 44 | | |
|---|---|---|
| updated freshness value $FV_{Snew}$) | Payload | Sender MAC ($FV_{Snew}$ \|\| Payload \|\| Challenge) |

Thus, the functional message 44 serves as a challenge response to the challenge message 42 to confirm that the receiver nonce $N_i$ included in the most recent challenge message 42 is correct. The updated freshness value $FV_{Snew}$ is associated with and created by the sender node 20 at the time the functional message 44 is generated. Receiving a correct response to the challenge message 42, within an appropriate time interval, confirms to the receiver node 22 that the sender node 20 is alive and that the response is indeed a fresh message coming from the sender node 20. That is, the response is not an old message that has been delayed and then replayed by an attacker.

It is to be appreciated that the challenge message 42 is implicitly included as part of the functional message 44. It is to be appreciated that the challenge message 42 is considered implicit because the challenge message is computed based on the concatenation of updated freshness value $FV_{Snew}$, a payload, and the receiver nonce $N_i$ sent by the receiver node 22.

In one embodiment, the functional message 44 may include additional information as well. For example, the sender message authentication code may include an identifier associated with the receiver node 22, which is referred to the receiver identifier (Receiver ID). It is to be appreciated that the sender message authentication code (Sender MAC) may include the receiver identifier in instances where a pair of nodes (i.e., the sender node 20 and the receiver node 22) do not have separate sender/receiver keys. Thus, if some other receiver node 22 intercepts the functional message 44 intended for the receiver node 22, the other receiver node 22 knows the sender message authentication code (Sender MAC) is not a valid response. Thus, the added receiver identifier (Receiver ID) may serve to eliminate confusion as to whom the functional message 44 is intended for. This may not be achieved through the message authentication codes since all sender and receiver nodes 20, 22 share the same MAC keys, which makes it difficult to tell which node 20, 22 among the subject sender and receiver nodes 20, 22 has computed any given message authentication code. In another embodiment, shared session keys may be provided for each pair of nodes. Alternatively, separate session keys may be provided for each pair of nodes. In yet another embodiment, symmetric/asymmetric keys may be provided instead.

In response to receiving the functional message 44 from the sender node 20, the receiver node 22 compares the updated freshness value $FV_{Snew}$ with a current freshness value $FV_S$ associated with the sender node 20, confirms the sender message authentication code (Sender MAC) is correct and consistent over at least one previous challenge message 42 sent from the receiver node 22, and confirms that the challenge message 42 included as part of the functional message 44 from the receiver node 22 is correct (i.e., the sender node 20 confirms that the receiver nonce $N_i$ included in the challenge message 42 is correct).

The current freshness value $FV_S$ represents a freshness value associated with the sender node 20 as understood by the receiver node 22. The receiver node 22 maintains its own copy of the current freshness value $FV_S$. For example, the receiver node 22 may store the current freshness value $FV_S$ in special memory. The special memory may include, for example, non-volatile memory or fault-tolerant secure memory. The receiver node 22 updates the current freshness value $FV_S$ only if the updated freshness value $FV_{Snew}$ is larger than the value of the current freshness value $FV_S$ saved in the special memory and the sender message authentication code (Sender MAC) is correct. Otherwise, the receiver node 22 rejects the functional message 44 and keeps the current freshness value $FV_S$ unchanged.

In response to determining the updated freshness value $FV_{Snew}$ is more recent when compared to the current freshness value $FV_S$ (i.e., the updated freshness value $FV_{Snew}$ is greater than the current freshness value $FV_S$, or $FV_{Snew}>FV_S$), the sender message authentication code (Sender MAC) is correct and consistent over the at least one the previous challenge message 42 from the receiver node 22, and the response to the challenge message 42 included as part of the functional message 44 from the receiver node 22 is correct, the receiver node 22 updates the current freshness value $FV_S$ to match the updated freshness value $FV_{Snew}$ (i.e., $FV_{Snew}=FV_S$) within the special memory of the receiver node 22 and accepts the functional message 44 from the sender node 20.

In one non-limiting embodiment, after the receiver node 22 accepts the functional message 44 from the sender node 20, the receiver node 22 may continue to periodically transmit the challenge messages 42 to the sender node 20 at the heartbeat time interval $T_h$. However, in an alternative embodiment, once the receiver node 22 accepts the functional message 44 from the sender node 20, the receiver node 22 may cease periodically transmitting the challenge messages 42 to the sender node 20 at the heartbeat time interval $T_h$ for the remainder of the current session. In the embodiment as shown in FIG. 1 where the communication network 10 is implemented as part of the vehicle 12, a drive cycle is representative of a session. In the event the receiver node 22 rejects the functional message 44 from the receiver node 22, the receiver node 22 may then continue to periodically transmit the challenge messages 42 to the sender node 20 at the heartbeat time interval $T_h$.

As mentioned above, in response to receiving the functional message 44 from the sender node 20, the receiver node 22 confirms the sender message authentication code (Sender MAC) is correct and consistent over at least one previous challenge message 42 received from the receiver node 22. It is to be appreciated that in embodiments, the receiver node 22 confirms the sender message authentication code (Sender MAC) is correct and consistent over a predefined number n of previous challenge messages 42 from the receiver node 22, where the predefined number n is equal to or greater than 2. It is to be appreciated that although the predefined number n may be any value greater than or equal to 2, increasing the predefined number n also increases the opportunity for an unauthorized party to create delay attack. It is also to be appreciated that including more than one previous challenge message 42 when confirming the sender message authentication code (Sender MAC) prevents the functional messages 44, which are sent by the sender node 20 after the receiver node 22 has transmitted an updated challenge message 42 but before the sender node 20 has had an opportunity to receive the updated challenge message 42, from being rejected by the receiver node 22. An example of this situation is illustrated in the data flow diagram of FIG. 3.

Figure 3:
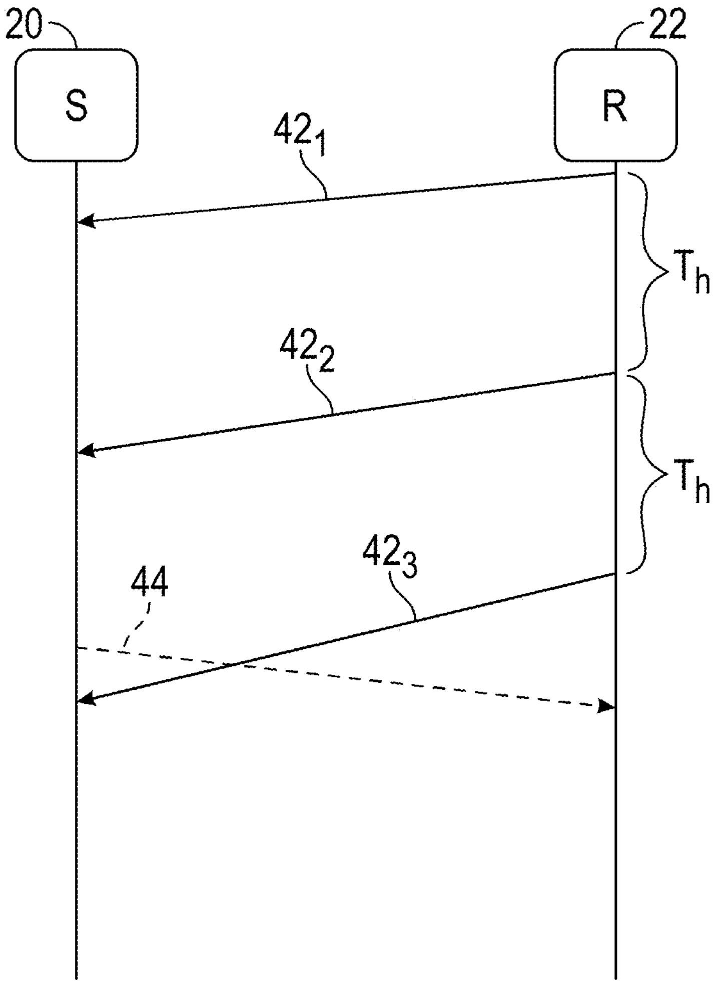
FIG. 3 is a data flow diagram of the unicast transmission shown in FIG. 2, according to an exemplary embodiment.

Referring to FIG. 3, the receiver node 22 transmits a first challenge message 421 to the sender node 20. After the heartbeat time interval $T_h$ has elapsed, the receiver node 22 then transmits a second challenge message 422 to the sender node 20. As seen in FIG. 3, after the receiver node 22 transmits a third challenge message 423 but before the sender node 20 receives the third challenge message 423, the sender node 20 transmits a functional message 44 including a sender message authentication code (Sender MAC). The sender message authentication code (Sender MAC) of the functional message 44 includes a response to the second challenge message 422 from the receiver node 22. However, as long as the predefined number n is equal to at least 2, then the receiver node 22 may accept the functional message 44, which includes the response to the second challenge message 422 instead of the third challenge message 423 from the receiver node 22.

FIG. 4A illustrates another embodiment of the communication network 110 based on a multicast transmission where a sender node 120 exchanges messages with a plurality of receiver nodes 122. In the embodiment as shown in FIG. 4A, the sender node 120 transmits the functional message 144 to a portion of the plurality of receiver nodes 122 that are part of the communication network 10. Specifically, the sender node 120 transmits the functional message 144 to receiver nodes $R_A$ and $R_B$, but not receiver node $R_C$. In another embodiment, which is shown in FIG. 4B, the sender node 120 transmits the functional message 144 to all of the receiver nodes 122 ($R_A$, $R_B$, $R_C$) that are part of the communication network 110.

Referring to both FIGS. 4A and 4B, the plurality of nodes 122 that are part of the communication network 10 each periodically transmits a unique challenge message 142$_x$ to the sender node 120 at the heartbeat time interval $T_h$, where each unique challenge message 142$_x$ corresponds to one of the plurality of receiver nodes 122. Specifically, in the embodiment as shown in FIGS. 4A and 4B, the receiver nodes $R_A$, $R_B$, $R_C$ each transmits a unique challenge message 142$_A$, 142$_B$, 142$_C$ to the sender node 120.

In response to receiving the unique challenge messages 142$_x$ from each of the plurality of receiver nodes 122, the sender node 120 either accepts or rejects each unique challenge message 142$_x$. In the example as shown in FIG. 4A, the sender node 120 accepts the unique challenge messages 142$_A$, 142$_B$ from the receiver nodes $R_A$ and $R_B$, and in the example as shown in FIG. 4B the sender node 120 accepts all of the unique challenge messages 142$_A$, 142$_B$, 142$_C$.

In response to accepting the unique challenge messages 142$_x$ corresponding to two or more of the plurality of receiver nodes 122 and determining there is data to transmit to the two or more receiver nodes 122, the sender node 120 creates and transmits the functional message 144 to the two or more receiver nodes 122. As seen in Tables 2A and 2B below, the functional message 144 includes an updated freshness value $FV_{Snew}$, a payload, and the unique challenge messages 142$_x$ from the two or more receiver nodes 122 ($Challenge_x$) that are accepted by the sender node 120. In the example as shown in Table 2A, the functional message 144 includes two unique challenge messages 142$_x$ ($Challenge_A$, $Challenge_B$) that correspond to the receiver nodes $R_A$, $R_B$ illustrated in FIG. 4A. In the example as shown in Table 2B, the functional message 144 includes three unique challenge messages 142$_x$ ($Challenge_A$, $Challenge_B$, $Challenge_C$) that correspond to the receiver nodes $R_A$, $R_B$, $R_C$ illustrated in FIG. 4B.

In the example as shown in Table 2A, the functional message 144 includes a sender message authentication code (Sender MAC) that is computed based on a concatenation of the updated freshness value $FV_{Snew}$, the payload, and the two or more unique challenge messages 142$_x$ received from the two or more receiver nodes 122 (i.e., $FV_{Snew}$||Payload||$Challenge_A$||$Challenge_B$). In the example as shown in Table 2B, the functional message 144 includes a sender message authentication code (Sender MAC) that is computed based on a concatenation of the updated freshness value $FV_{Snew}$, the payload, and the two or more unique challenge messages 142$_x$ received from all of the receiver nodes 122 (i.e., $FV_{Snew}$||Payload||$Challenge_A$||$Challenge_B$||$Challenge_C$). It is to be appreciated that each receiver node knows where its respective challenge is located within the functional message 144.

TABLE 2A

| functional message 144 | | | | |
|---|---|---|---|---|
| updated freshness value ($FV_{Snew}$) | Payload | $Challenge_A$ | $Challenge_B$ | Sender MAC ($FV_{Snew}$ \|\| Payload \|\| $Challenge_A$ \|\| $Challenge_B$) |

TABLE 2B

| functional message 144 | | | | | |
|---|---|---|---|---|---|
| updated freshness value ($FV_{Snew}$) | Payload | $Challenge_A$ | $Challenge_B$ | $Challenge_C$ | Sender MAC ($FV_{Snew}$ \|\| Payload \|\| $Challenge_A$ \|\| $Challenge_B$ \|\| $Challenge_C$) |

It is to be appreciated that the two or more unique challenge messages 142$x$ are explicitly included as part of the functional message 144. In other words, the two or more unique challenge messages 142$x$ are considered explicit because the challenge messages 142$x$ are part of the functional message 144 itself.

In response to receiving the functional message 144 from the sender node 120, a particular receiver node 122 may then compare the updated freshness value $FV_{Snew}$ with the current freshness value $FV_S$, confirm the sender message authentication code (Sender MAC) is correct and consistent over at least one previous challenge message 142$_x$, and confirm the unique challenge message 142$_x$ from the receiver node 122 is correct (i.e., the sender node 120 confirms that the receiver nonce $N_i$ included in the challenge message 142$_x$ is correct). The current freshness value $FV_S$ represents a freshness value associated with the sender node 120 as understood by the particular receiver node 122. For example, if the particular receiver node 122 is the receiver node $R_A$, then the current freshness value $FV_S$ represents a freshness value associated with the sender node 120 as understood by the receiver node $R_A$.

In response to determining the updated freshness value $FV_{Snew}$ is more recent when compared to a current freshness value $FV_S$, the sender message authentication code (Sender MAC) is correct and consistent over at least one previous challenge message 142$_x$ from the particular receiver node 122, and the unique challenge message 142$_x$ from the particular receiver node 122 is correct, the particular receiver node 122 updates the current freshness value $FV_S$ to match the updated freshness value $FV_{Snew}$ (i.e., $FV_{Snew}$=$FV_S$) within the special memory of the particular receiver node 122 and accepts the functional message 144 from the sender node 120.

Figure 5:
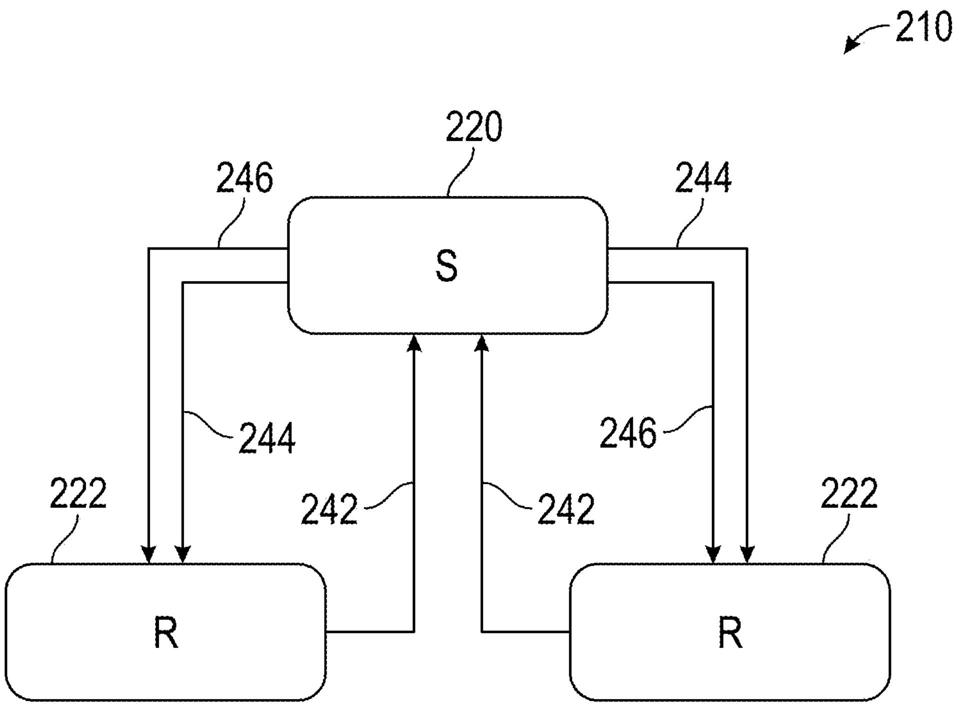
FIG. 5 illustrates yet another embodiment of the communication network, according to an exemplary embodiment.

FIG. 5 illustrates yet another embodiment of the communication network 210. In the embodiment as shown in FIG. 5, the communication network 210 includes two receiver nodes 222 and is based on a multicast transmission. However, it is to be appreciated that in embodiments the communication network 210 may be based on a unicast transmission instead. Upon boot, the one or more receiver nodes 222 initializes the status of the sender node 220 as non-responsive. The one or more receiver nodes 222 store the status of the sender node 220 in memory. The one or more receiver nodes 222 also start both a heartbeat timer based on the heartbeat time interval $T_h$ and liveliness timer based on a liveliness time interval $T_L$, where the liveliness time interval $T_L$ is less than the heartbeat time interval $T_h$, or $T_L<T_h$.

It is to be appreciated that the one or more receiver nodes 222 accepts functional messages 244 from the sender node 220 when the status of the sender node 220 is responsive. In other words, the one or more receiver nodes 222 are unable to accept functional messages 244 from the sender node 220 when the status of the sender node 220 is set to non-responsive. However, the one or more receiver nodes 222 accepts response messages 246 from the sender node 220 when the status of the sender node 220 is set to either responsive or non-responsive. The response messages 246 represent a dedicated response generated by the sender node 220 in response to receive the challenge message 242 from a receiver node 222. Thus, it is to be appreciated that in the embodiment as shown in FIG. 5, the functional message 244 does not contain a response to the challenge message 242 from the sender node 220.

In response to determining the heartbeat timer has timed out and the heartbeat time interval $T_h$ has elapsed, the one or more receiver nodes 222 transmit the challenge message 242 and resets both the heartbeat timer and the liveliness timer. As mentioned above, the challenge message 242 may include the receiver nonce ($N_i$) and the receiver message authentication code ((MAC) ($N_i$)) generated based on the receiver nonce ($N_i$) or, in the alternative, the challenge message 242 may only include the receiver nonce ($N_i$) when the receiver nonce ($N_i$) is difficult to predict.

In response to receiving the challenge message 242, the sender node 220 either accepts or rejects the challenge message 242. In response to accepting the challenge message 242, the sender node 220 creates and transmits a response message 246 to the receiver node 222. As seen in Table 3 below, the response message 246 includes the updated freshness value $FV_{Snew}$ associated with the sender node 220 and the receiver nonce ($N_i$) from the challenge message 242. Specifically, the response message 246 includes a sender message authentication code (Sender MAC) that is computed based on a concatenation of the updated freshness value $FV_{Snew}$ associated with the sender node 220 and the receiver nonce ($N_i$) from the challenge message 242. It is to be appreciated that the response message 246 does not include the payload. Instead, as shown in Table 4 below, the functional message 244 includes the payload. The updated freshness value $FV_{Snew}$ is associated with and created by the sender node 220 at the time the response message 246 is generated. It is also to be appreciated that while Table 3 illustrates the receiver nonce ($N_i$) from the challenge message 242 implicitly included as part of the response message 246, in another embodiment the receiver nonce ($N_i$) from the challenge message 242 may be explicitly included as part of the response message 246 as well.

TABLE 3

| response message 246 | |
|---|---|
| updated freshness value ($FV_{Snew}$) | Sender MAC ($FV_{Snew}$ ‖ receiver nonce ($N_i$)) |

In response to receiving the response message 246 before the liveliness timer runs out and the liveliness time interval $T_L$ has lapsed, a particular receiver node 222 compares the updated freshness value $FV_{Snew}$ with the current freshness value $FV_S$ associated with the sender node 220, confirms the sender message authentication code (Sender MAC) is correct and consistent with the receiver nonce $N_i$, and confirms that the receiver nonce $N_i$ is correct. In response to determining the updated freshness value $FV_{Snew}$ is more recent when compared to the current freshness value $FV_S$ ($FV_{Snew}>FV_S$), the sender message authentication code (Sender MAC) is correct and consistent with the receiver nonce $N_i$, and the receiver nonce $N_i$ is correct, the one or more receiver nodes 222 updates the current freshness value $FV_S$ to match the updated freshness value $FV_{Snew}$ (i.e., $FV_{Snew}$=$FV_S$) within the special memory of the receiver node 222, accepts the response message 246, and sets the status of the sender node 220 as responsive. Otherwise, the one or more receiver nodes 222 rejects the response message 246 and sets the status of the sender node 220 to non-responsive.

As mentioned above, when the status of the sender node 220 is set to responsive, the particular receiver node 222 may now accept functional messages 244 from the sender node 220. It is to be appreciated that in response to determining the liveliness timer has timed out and the response message 246 from the sender node 220 was not received, the one or more receiver nodes 222 may set the status of the sender node 220 as non-responsive.

Figure 6:
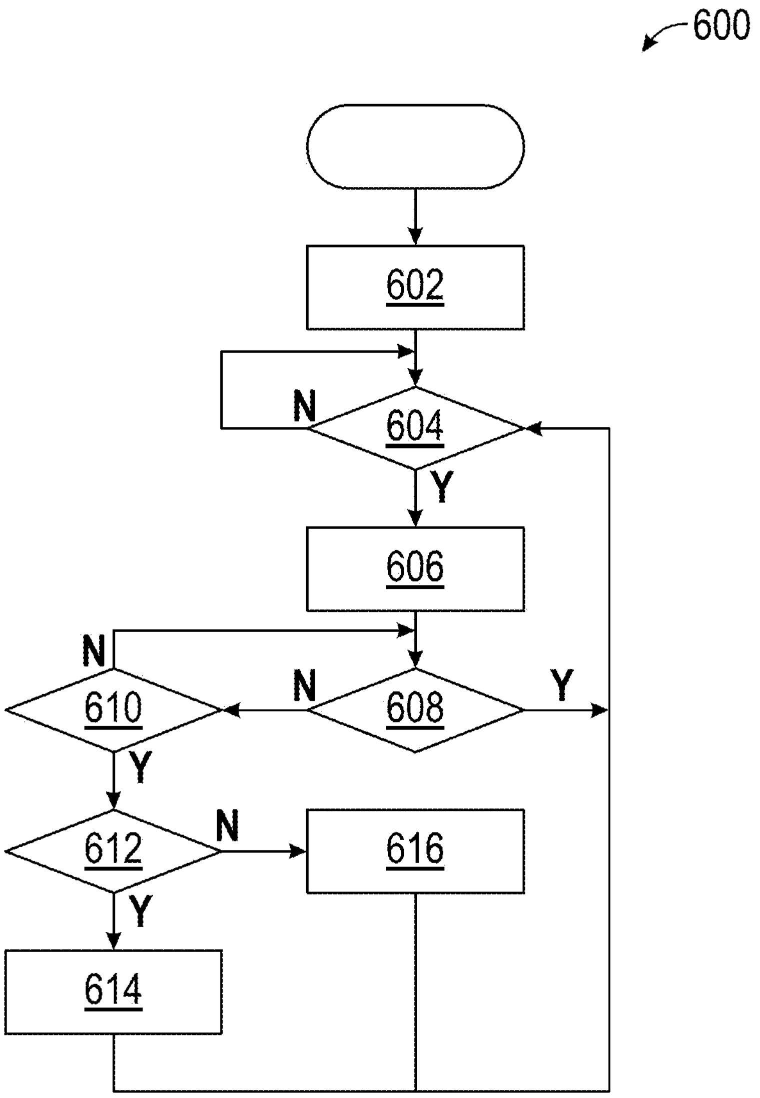
FIG. 6 is a process flow diagram illustrating a method for receiving a response message from the sender node by the receiver nodes shown in FIG. 5, according to an exemplary embodiment.

FIG. 6 is a process flow diagram illustrating a method 600 for receiving the response message 246 from the sender node 220 by the one or more receiver nodes 222 shown in FIG. 5. Referring to FIGS. 5 and 6, the method 600 may begin at block 602. In block 602, upon boot the one or more receiver nodes 222 initializes the status of the sender node 220 as non-responsive, where the one or more receiver nodes 222 store the status of the sender node 220 in memory. The one or more receiver nodes 222 also start the heartbeat timer based on the heartbeat time interval $T_h$ and the liveliness timer based on the liveliness time interval $T_L$, where the liveliness time interval $T_L$ is less than the heartbeat time interval $T_h$, or $T_L<T_h$. The one or more receiver nodes 222 also transmit a challenge message 242 to the sender node 220. The method 600 may then proceed to decision block 604.

In decision block 604, the one or more receiver nodes 222 monitor the heartbeat timer until determining the heartbeat timer has timed out and the heartbeat time interval $T_h$ has elapsed. In response to determining the heartbeat timer has timed out and the heartbeat time interval $T_h$ has elapsed, the method 600 may proceed to block 606.

In block 606, one or more receiver nodes 222 transmit the challenge message 242 to the sender node 220 and resets both the heartbeat timer and the liveliness timer. The method 600 may proceed to decision block 608.

In decision block 608, the one or more receiver nodes 222 continue to monitor the liveliness timer to determine when the liveliness time interval $T_L$ has lapsed. In response to determining the liveliness time interval has not lapsed, the method 600 may proceed to decision block 610.

In decision block 610, the one or more receiver nodes 222 determines if the response message 246 has been received from the sender node 220. In response to determining the response message has not been received, the method 600 returns to block 608. Otherwise, the method 600 may proceed to decision block 612.

In decision block 612, the one or more receiver nodes 222 compares the updated freshness value $FV_{Snew}$ with the current freshness value $FV_S$ associated with the sender node 220, confirms the sender message authentication code (Sender MAC) is correct and consistent with the receiver nonce $N_i$, and confirms that the receiver nonce $N_i$ is correct. In response to determining the updated freshness value $FV_{Snew}$ is more recent when compared to the current freshness value $FV_S$ ($FV_{Snew}>FV_S$), the sender message authentication code (Sender MAC) is correct and consistent with the receiver nonce $N_i$, and the receiver nonce $N_i$ is correct, the method 600 may proceed to block 614. Otherwise, the method proceeds to block 616.

In block 614, the one or more receiver nodes 222 updates the current freshness value $FV_S$ to match the updated freshness value $FV_{Snew}$ (i.e., $FV_{Snew}=FV_S$) within the special memory of the one or more receiver nodes 222, accepts the response message 246, and sets the status of the sender node 220 as responsive. The method 600 may then return to block 604.

Referring back to decision block 608, in response to determining the liveliness timer has timed out and the liveliness time interval $T_L$ has elapsed, the method 600 may return to block 604.

In block 616, the one or more receiver nodes 222 rejects the response message 246 and sets the status of the sender node 220 to non-responsive. The method 600 may then return to block 604.

Referring back to FIG. 5, after transmitting the response message 246 and determining there is data to transmit to the receiver node 222, the sender node 220 creates and transmits the functional message 244 to the one or more receiver nodes 222. As seen in Table 4 below, the functional message 244 includes a secondary updated freshness value $FV_{Snew2}$ associated with the sender node 220 and the payload. Specifically, the functional message 244 includes a secondary sender message authentication code (Sender MAC2) that is computed based on a concatenation of the secondary updated freshness value $FV_{Snew2}$ and the payload (i.e., $FV_{Snew2}$||Payload). The secondary updated freshness value $FV_{Snew2}$ is associated with and created by the sender node 220 at the time the functional message 244 is generated.

TABLE 4

| functional message 244 | | |
|---|---|---|
| updated freshness value ($FV_{Snew2}$) | Payload | Sender MAC2 ($FV_{Snew2}$ \|\| Payload) |

In response to receiving the functional message 244 from the sender node 20, the receiver node 222 compares the secondary updated freshness value $FV_{Snew2}$ with a current freshness value $FV_S$ associated with the sender node 220, confirms the secondary sender message authentication code (Sender MAC2) is correct and consistent over at least one previous challenge message 242 received from the receiver node 222, and that the status of the sender node 220 is set to responsive. In response to determining the secondary updated freshness value $FV_{Snew2}$ is more recent when compared to the current freshness value $FV_S$, the secondary sender message authentication code (Sender MAC2) is correct and consistent over at least one previous challenge message 242 received from the receiver node 222, and that the status of the sender node 220 is set to responsive, the one or more receiver nodes 222 updates the current freshness value $FV_S$ to match the secondary updated freshness value $FV_{Snew2}$ (i.e., $FV_{Snew2}=FV_S$) within the special memory of the receiver node 222 and accepts the functional message 244 from the sender node 220. Otherwise, the functional message 244 is rejected.

It is to be appreciated that as long as the secondary updated freshness value $FV_{Snew2}$ is more recent when compared to the current freshness value $FV_S$ and the secondary sender message authentication code (Sender MAC2) is correct and consistent over at least one previous challenge message 242 received from the receiver node 222, the one or more receiver nodes 222 updates the current freshness value $FV_S$ to match the secondary updated freshness value $FV_{Snew2}$ (i.e., $FV_{Snew2}=FV_S$) within the special memory of the receiver node 222, regardless of the status of the sender node 220.

Figure 7:
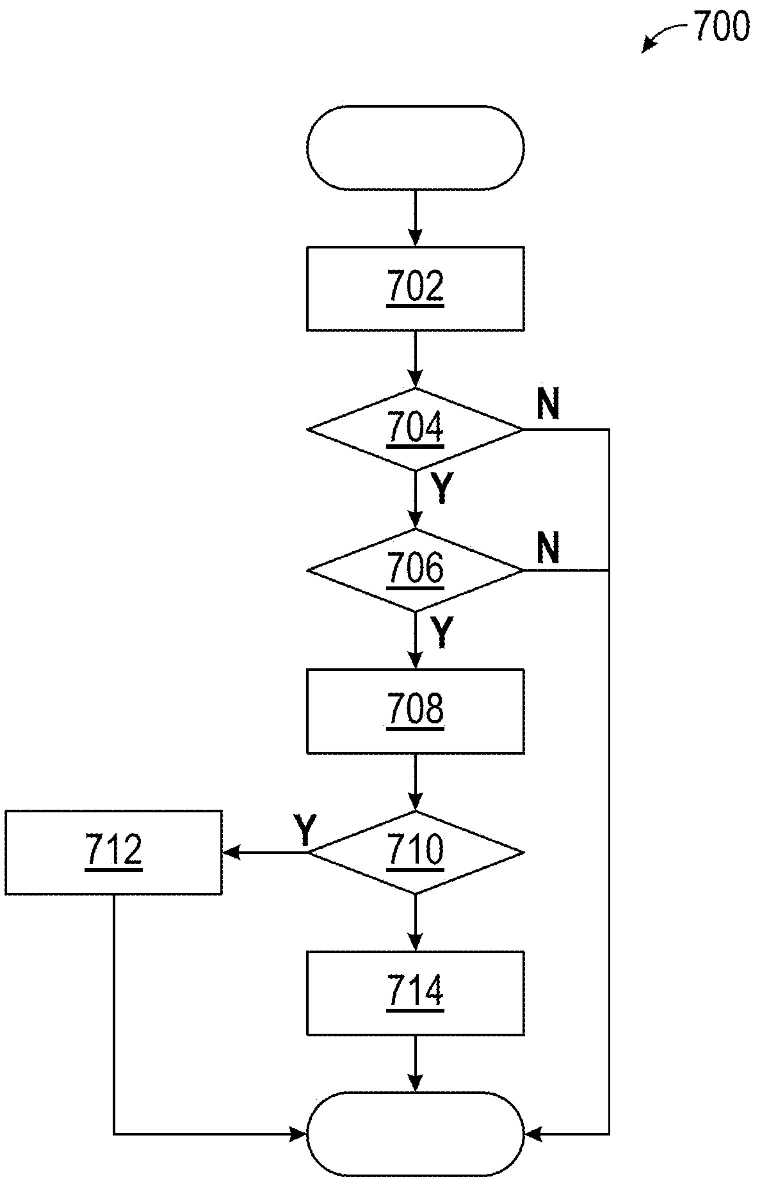
FIG. 7 is a process flow diagram illustrating a method for receiving a message by the receiver nodes from the sender node shown in FIG. 5, according to an exemplary embodiment.

FIG. 7 is an exemplary process flow diagram illustrating a method 700 for receiving a message by the one or more receiver nodes 222 from the sender node 220 shown in FIG. 5, where the message is either the response message 246 or the functional message 244. Referring to FIGS. 6 and 7, the method 700 may begin at block 702. In block 702, the one or more receiver nodes 222 receive a message from the sender node 220. The method 700 may then proceed to decision block 704.

In decision block 704, the one or more receiver nodes 222 compare either the updated freshness value $FV_{Snew}$ with the current freshness value $FV_S$ associated with the sender node 220 if the message is a challenge message 242 or the secondary updated freshness value $FV_{Snew2}$ with the current freshness value $FV_S$ associated with the sender node 220 if the message is a functional message 244. In response to determining either the updated freshness value $FV_{Snew}$ is more recent when compared to the current freshness value $FV_S$ or the secondary updated freshness value $FV_{Snew2}$ is more recent when compared to the current freshness value $FV_S$, the method 700 proceeds to decision block 706. Otherwise, the message is rejected by the one or more receiver nodes 222, the method 700 may terminate.

In decision block 706, the one or more receiver nodes 222 confirms the secondary sender message authentication code (Sender MAC2) from either the response message 246 or the functional message 244 is correct and consistent over at least one previous challenge message 242 received from the receiver node 222. In response to determining the secondary sender message authentication code (Sender MAC2) from either the response message 246 or the functional message 244 is correct and consistent over at least one previous challenge message 242 received from the receiver node 222, the method 700 may proceed to block 708. Otherwise, the method 700 may terminate.

In block 708, the one or more receiver nodes 222 updates the current freshness value $FV_S$ to match either the updated freshness value $FV_{Snew}$ (i.e., $FV_{Snew2}=FV_S$) if the message is the response message 246 or the secondary updated freshness value $FV_{Snew2}$ if the message is the functional message 244 within the special memory of the receiver node 222. The method 700 may then proceed to decision block 710.

In decision block 710, in response to determining the message is the response message 246, the method proceeds to block 712. In block 712, the one or more receiver nodes 222 set a value in memory indicating the response message 246 to the most recent challenge message 242 has been received (i.e., Response Received=TRUE), and the method 700 may terminate. Otherwise, if the message is the functional message 244, the method 700 proceeds to block 714.

In block 714, the one or more receiver nodes 222 check the status of the sender node 220. In response to determining the status of the sender node 220 is non-responsive, the one or more receiver nodes 222 rejects the functional message 244, and the method 700 terminates. Otherwise, the method 700 proceeds to block 714.

In block 714, the one or more receiver nodes 222 accepts the functional message 244 from the sender node 220. The method 700 may then terminate.

Referring generally to the figures, the disclosed communication network provides various technical effects and benefits. Specifically, the disclosed communication network provides multiple approaches for mitigating instances of delay attacks between the sender node and one or more receiver nodes by identifying timing delays in messages sent from the sender node. The one or more receiver nodes identify timing delays by verifying the freshness value and the message authentication code included in the messages received from the sender node. In embodiments, the receiver nodes utilize liveliness to verify the sender node is alive and to detect timing delays.

The nodes may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A communication network for mitigating delay attacks, the communication network comprising:

one or more sender nodes;

one or more receiver nodes; and a communication link, wherein the one or more sender nodes are in electronic communication with the one or more receiver nodes by the communication link, and wherein the one or more sender nodes and the one or more receiver nodes execute instructions to:

periodically transmit, by a receiver node that is part of the one or more receiver nodes, a challenge message to a sender node at a heartbeat time interval;

accept, by the sender node, the challenge message;

in response to accepting the challenge message and determining there is data to transmit to the receiver node, transmit, by the sender node, a functional message to the receiver node including a sender message authentication code that is computed based on a concatenation of an updated freshness value associated with the sender node, a payload, and the challenge message; and in response to determining the updated freshness value is more recent when compared to a current freshness value associated with the sender node, the sender message authentication code is correct and consistent over at least one previous challenge message from the receiver node, and the challenge message from the receiver node is correct, update, by the receiver node, the current freshness value to match the updated freshness value and accept the functional message.

2. The communication network of claim 1, wherein the challenge message includes a receiver nonce.

3. The communication network of claim 2, wherein the challenge message includes a receiver message authentication code that is generated based on the receiver nonce.

4. The communication network of claim 2, wherein the challenge message is a challenge response to the challenge message that confirms the receiver nonce included in the challenge message is correct.

5. The communication network of claim 1, wherein the updated freshness value is created by the sender node at the time the functional message is generated.

6. The communication network of claim 1, wherein the current freshness value represents a freshness value associated with the sender node as understood by the receiver node.

7. The communication network of claim 1, wherein the receiver node confirms the sender message authentication code is correct and consistent over a predefined number of previous challenge messages from the receiver node, and wherein the predefined number is equal to or greater than 2.

8. The communication network of claim 1, wherein the challenge message from the receiver node is implicitly included as part of the functional message.

9. The communication network of claim 1, wherein the one or more sender nodes and the one or more receiver nodes are one of the following: an electronic control module (ECU) that controls one or more systems that are part of a vehicle, a smart sensor, and a smart actuator.

10. A communication network for mitigating delay attacks, the communication network comprising:

one or more sender nodes;

a plurality of receiver nodes; and a communication link, wherein the one or more sender nodes are in electronic communication with the plurality of receiver nodes by the communication link, and wherein the one or more sender nodes and the plurality of receiver nodes execute instructions to:

periodically transmit, by the plurality of receiver nodes, a unique challenge message to a sender node at a heartbeat time interval, wherein each unique challenge message corresponds to one of the plurality of receiver nodes;

accept, by the sender node, the unique challenge messages;

in response to accepting the unique challenge messages from the plurality of receiver nodes and determining there is data to transmit to two or more receiver nodes, transmit, by the sender node, a functional message to the two or more receiver nodes that includes an updated freshness value associated with the sender node, a payload, the unique challenge messages from the two or more receiver nodes, and a sender message authentication code that is computed based on a concatenation of the updated freshness value, the payload, and the unique challenge messages from the two or more receiver nodes; and in response to determining the updated freshness value is more recent when compared to a current freshness value associated with the sender node, the sender message authentication code is correct and consistent over at least one previous challenge message from a particular receiver node, and the unique challenge message from the particular receiver node is correct, update, by the particular receiver node, the current freshness value to match the updated freshness value and accept the functional message.

11. The communication network of claim 10, wherein the unique challenge message includes a receiver nonce.

12. The communication network of claim 11, wherein the unique challenge message includes a receiver message authentication code that is generated based on the receiver nonce.

13. The communication network of claim 10, wherein the updated freshness value is created by the sender node at the time the functional message is generated.

14. The communication network of claim 10, wherein the current freshness value represents a freshness value associated with the sender node as understood by the particular receiver node.

15. The communication network of claim 10, wherein the unique challenge message from the particular receiver node is explicitly included as part of the functional message.

16. A communication network for mitigating delay attacks in a vehicle, the communication network comprising:

one or more sender nodes;

one or more receiver nodes, wherein the one or more sender nodes and the one or more receiver nodes are an electronic control module (ECU) that controls one or more systems that are part of the vehicle; and a communication link, wherein the one or more sender nodes are in electronic communication with the one or more receiver nodes by the communication link, and wherein the one or more receiver nodes execute instructions to:

upon boot, initialize a status of a sender node as non-responsive, wherein the one or more receiver nodes store the status of the sender node in memory;

start a heartbeat timer based on a heartbeat time interval and a liveliness timer based on a liveliness time interval, wherein the liveliness time interval is less than the heartbeat time interval;

monitor the heartbeat timer until determining the heartbeat time interval has elapsed;

in response to determining the heartbeat time interval has elapsed, transmit, by the one or more receiver nodes, a challenge message to a sender node and reset both the heartbeat timer and the liveliness timer, wherein the challenge message includes a receiver nonce;

receive a response message from the sender node before the liveliness time interval has elapsed, wherein the response message includes a sender message authentication code that is computed based on a concatenation of an updated freshness value associated with the sender node and the receiver nonce from the challenge message; and in response to determining the updated freshness value is more recent when compared to a current freshness value, the sender message authentication code is correct and consistent with the receiver nonce, and the receiver nonce is correct, update the current freshness value to match the updated freshness value, accept the response message, and set the status of the sender node as responsive.

17. The communication network of claim 16, wherein the one or more receiver nodes accepts functional messages from the sender node in response to determining the status of the sender node is responsive.

18. The communication network of claim 16, wherein the one or more receiver nodes accepts response messages from the sender node in response to determining the status of the sender node is either responsive or non-responsive.

19. The communication network of claim 16, wherein the one or more receiver nodes execute instructions to:

receive a functional message from the sender node, wherein the functional message includes a secondary sender message authentication code that is computed based on a concatenation of a secondary updated freshness value and a payload; and compare the secondary updated freshness value with the current freshness value associated with the sender node, confirm the secondary sender message authentication code is correct and consistent over at least one previous challenge message, and confirm the status of the sender node is set to responsive.

20. The communication network of claim 19, wherein the one or more receiver nodes execute instructions to:

in response to determining the secondary updated freshness value is more recent when compared to the current freshness value, the secondary sender message authentication code is correct and consistent over at least one previous challenge message, and the status of the sender node is set to responsive, update the current freshness value to match the secondary updated freshness value and accept the functional message from the sender node.

* * * * *